United States Patent
Guo et al.

(10) Patent No.: US 11,800,580 B2
(45) Date of Patent: Oct. 24, 2023

(54) METHOD, DEVICE, AND ELECTRONIC APPARATUS FOR ESTABLISHING BEAM CONNECTION

(71) Applicant: Lenovo (Beijing) Co., Ltd., Beijing (CN)

(72) Inventors: Heng Guo, Beijing (CN); Yixiang Song, Beijing (CN); Yanpeng Zhang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 453 days.

(21) Appl. No.: 17/010,327

(22) Filed: Sep. 2, 2020

(65) Prior Publication Data
US 2021/0068180 A1 Mar. 4, 2021

(30) Foreign Application Priority Data
Sep. 4, 2019 (CN) .......................... 201910831722.4

(51) Int. Cl.
*H04W 76/14* (2018.01)
*H04W 4/029* (2018.01)
*H04B 7/06* (2006.01)
*H04B 7/08* (2006.01)
*H04W 16/28* (2009.01)

(52) U.S. Cl.
CPC .......... *H04W 76/14* (2018.02); *H04B 7/0695* (2013.01); *H04B 7/088* (2013.01); *H04W 4/029* (2018.02); *H04W 16/28* (2013.01)

(58) Field of Classification Search
CPC ..... H04W 76/14; H04W 4/029; H04W 16/28; H04W 76/15; H04B 7/0695; H04B 7/088; H04L 1/22
See application file for complete search history.

(56) References Cited

U.S. PATENT DOCUMENTS

| 11,402,894 B2 * | 8/2022 | Luo | .......................... G06F 3/017 |
| 2019/0006754 A1 | 1/2019 | Pallister et al. | |
| 2019/0059004 A1 * | 2/2019 | Norita | .................. H04B 7/0617 |
| 2020/0336183 A1 * | 10/2020 | Tsai | ........................ G06F 3/012 |
| 2020/0364187 A1 * | 11/2020 | Tran | ..................... H04B 7/0413 |

FOREIGN PATENT DOCUMENTS

| CN | 103718591 A | 4/2014 |
| CN | 107276644 A | 10/2017 |
| CN | 107888258 A | 4/2018 |
| CN | 109069921 A | 12/2018 |
| WO | 2018145154 A1 | 8/2018 |

* cited by examiner

*Primary Examiner* — Fred A Casca
(74) *Attorney, Agent, or Firm* — ANOVA LAW GROUP, PLLC (57) ABSTRACT

A method for establishing a beam connection includes determining, by a first device, a location of a first part of a user; transmitting and pointing a first beam to the location of the first part; receiving a second beam transmitted by a second device; and establishing a beam connection based on the second beam position. The second beam is sent based on a second beam position, and the second beam position is a beam position with an optimal signal determined by the second device according to a beam scanning based on the first beam.

18 Claims, 6 Drawing Sheets

Millimeter wave antenna array

METHOD, DEVICE, AND ELECTRONIC APPARATUS FOR ESTABLISHING BEAM CONNECTION

CROSS-REFERENCE TO RELATED APPLICATION

The present disclosure claims the priority of Chinese Patent Application No. 201910831722.4, filed with the State Intellectual Property Office of P. R. China on Sep. 4, 2019, the entire content of which is incorporated herein by reference.

TECHNICAL FIELD

The present disclosure relates to the field of communication technology and, in particular, to a method, device, and electronic apparatus for establishing a beam connection.

BACKGROUND

PC VR (PC-supported virtual reality technology) has high requirements for data throughput and latency. 60 GHz millimeter wave technology is employed in products of wireless PC VR to implement data communications. Before using the aforementioned technology to implement data communication, a beam connection needs to be established first, and then data is transmitted through the established beam connection. However, the current beam connection establishment process is complicated and troublesome, which leads to poor user experience.

SUMMARY

In accordance with the disclosure, one aspect of the present disclosure provides a method for establishing a beam connection includes determining, by a first device, a location of a first part of a user; transmitting and pointing a first beam to the location of the first part; receiving a second beam transmitted by a second device; and establishing a beam connection based on the second beam position. The second beam is sent based on a second beam position, and the second beam position is a beam position with an optimal signal determined by the second device according to a beam scanning based on the first beam.

Also, in accordance with the disclosure, another aspect of the present disclosure provides an electronic apparatus. The electronic apparatus includes a processor and a memory for storing executable instructions of the processor. When executed by the processor, the instructions cause the processor to determine a location of a first part of a user; transmit and point a first beam to the location of the first part; receive a second beam transmitted by a device; and establish a beam connection based on the second beam position. The second beam is sent based on a second beam position, and the second beam position is a beam position with an optimal signal determined by the device according to a beam scanning based on the first beam.

Also, in accordance with the disclosure, another aspect of the present disclosure provides a non-transitory computer readable storage medium storing a computer program. The computer program is executed by a processor to implement a method for establishing a beam connection. The method includes determining, by a first device, a location of a first part of a user; transmitting and pointing a first beam to the location of the first part; receiving a second beam transmitted by a second device; and establishing a beam connection based on the second beam position. The second beam is sent based on a second beam position, and the second beam position is a beam position with an optimal signal determined by the second device according to a beam scanning based on the first beam.

According to the embodiments of the present disclosure, a first device determines the location of the first part of the user, transmits and controls a first beam to point to the location of the first part, receives a second beam transmitted by a second device, and establishes a beam connection based on the second beam position. The second beam is sent out based on a second beam position, and the second beam position is the beam position with the optimal signal determined by the second device based on the beam scanning of the first beam. By implementing the method, the device, and the electronic apparatus for establishing a beam connection, after determining the location of the first part of the user mounted with the second device, the first beam is directly directed to the second device at the location of the first part, which can ensure that the signal is optimal. Compared with the conventional technologies where the first device needs to traverse the beam position to find the beam position having the optimal signal, the method in accordance with the embodiments of the present disclosure can greatly improve the beam matching speed and improve the user experience.

DESCRIPTION OF THE DRAWINGS

Drawings of some embodiments of the present disclosure are briefly described below. The drawings described below are only some embodiments of the present disclosure, and those skilled in the art can obtain other drawings according to the provided drawings without any creative work.

DETAILED DESCRIPTION

The technical solutions in the embodiments of the present disclosure are described in the following with reference to the drawings in the embodiments of the present disclosure. The described embodiments are only a part of the embodiments of the present disclosure, and not all of the embodiments. All other embodiments obtained by a person of ordinary skill in the art based on the embodiments of the present disclosure without departing from the inventive scope shall fall in the scope of the present disclosure.

Figure 1:
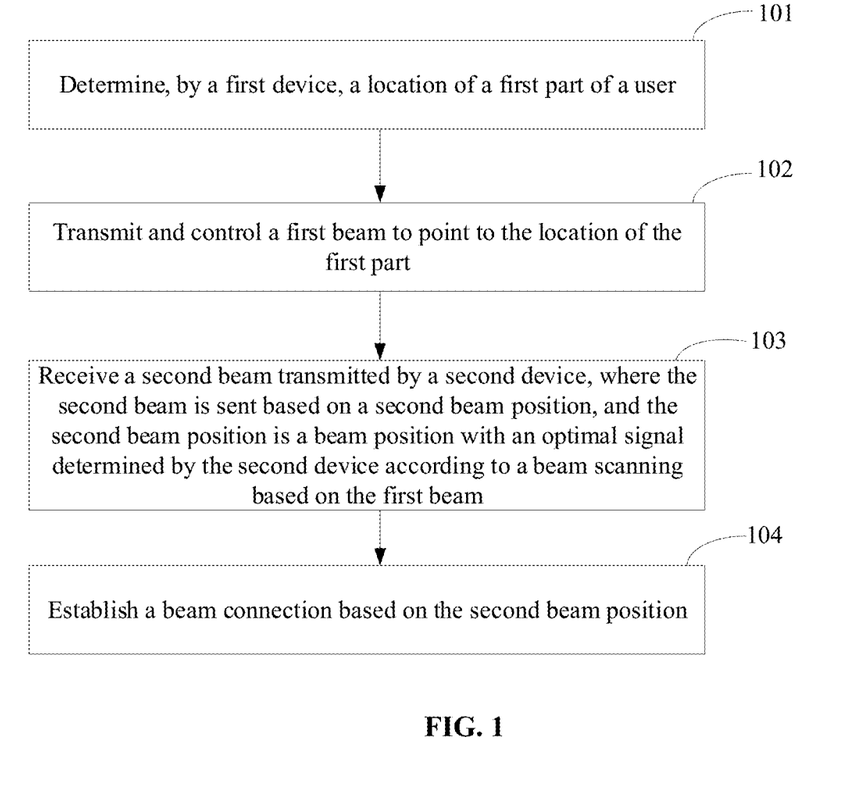
FIG. 1 is a flowchart of a method for establishing a beam connection according to an embodiment of the present disclosure.

FIG. 1 is a flowchart of a method for establishing a beam connection according to an embodiment of the present disclosure. As shown in FIG. 1, the method for establishing a beam connection may include the following steps.

101. A first device determines a location of a first part of a user.

In some embodiments, the execution subject of the method for establishing a beam connection is located on the side of the first device, and may be the processor of the first device. The first device and the user may not be at the same location. The first device can be, but is not limited to, a device at a PC side in PC VR device. The PC side and the VR side need to communicate data to bring better virtual reality experience to the user. The location of the first part may be determined according to the wearing location of the VR terminal. For example, the VR device is usually worn on the user's head, and the location of the first part may be the location of the user's head.

The first device determines the location of the first part of the user. For example, the first device may collect an image of the user in front of the first device, and then analyze and process the collected image through an artificial intelligence algorithm to identify the location of the first part of the user.

102. The first device transmits and controls a first beam to point to the location of the first part.

Figure 2:
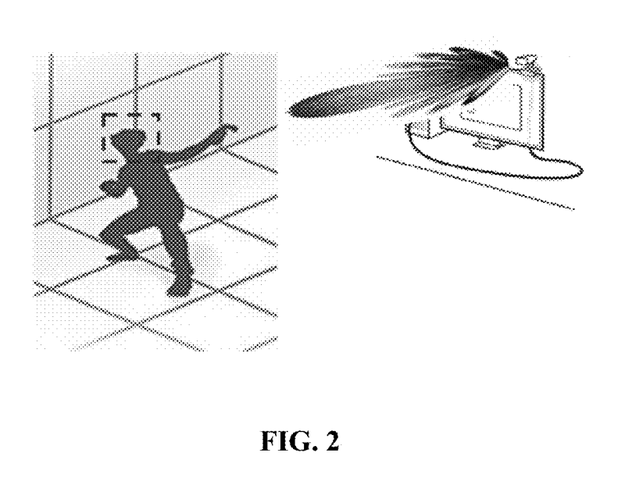
FIG. 2 is a schematic diagram of a first beam pointing to the head of a user according to an embodiment of the present disclosure.

After the location of the user's first part is determined by the analysis process, the first device can control the millimeter wave front to emit the first beam so that the first beam can directly point to the location of the first part. In some embodiment, the location of the first part is the part where the user wears the VR device, and it can thus be ensured that the first beam emitted by the first device side is optimal with respect to the signal of the VR device without obstruction. For example, FIG. 2 is a schematic diagram showing the first beam pointing to the location of the head of the user according to an embodiment of the present disclosure.

103. The first device receives a second beam transmitted by a second device. The second beam is sent out based on a second beam position, and the second beam position is the beam position with the optimal signal determined by the second device based on the beam scanning of the first beam.

In some embodiments, the second device may be a VR device in the PC VR device. After receiving the first beam sent by the first device, the second device can traverse all beam positions of the first beam to determine the second beam position having the optimal signal based on the first beam. The second device can then emit the second beam based on the second beam position.

104. The first establishes a beam connection based on the second beam position.

After the second device sends out the second beam, the second beam may directly establish a beam connection with the first beam. The established beam connection between the first beam and the second beam is a beam communication channel with an optimal signal between the first device and the second device.

In this embodiment, according to the method for establishing a beam connection, after determining the location of the first part of the user mounted with the second device, the first beam is directly pointed to the second device at the location of the first part, which can ensure that the signal is optimal. Compared with the conventional technologies where the first device needs to traverse the beam position to find the beam position having the optimal signal, the method in accordance with the embodiments of the present disclosure can greatly improve the beam matching speed and improve the user experience.

In some embodiments, determining the location of the first part of the user may include: collecting a first image through a camera; identifying and determining the head location of the person in the first image according to a head recognition algorithm; and determining coordinate locations of the head in a preset coordinate system.

Figure 3:
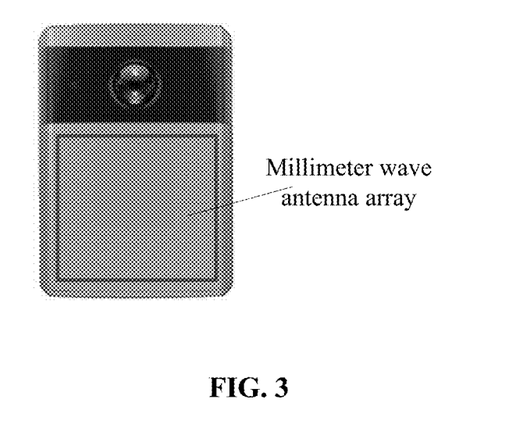
FIG. 3 is a schematic diagram of the millimeter wave antenna configured with a camera according to an embodiment of the present disclosure.

In some embodiments, as shown in FIG. 3, an optical camera may be added to the millimeter wave antenna module to transmit the beam on the first device side. As such, the first device may employ the camera to collect a first image that includes the user, perform identification analysis in the first image according to a head recognition algorithm to determine the location of the head. A two-dimensional coordinate system can be preset in the first device system according to the application environment. After the user's head location is recognized, the head location is recorded in the preset two-dimensional coordinate system. The corresponding first beam position can be determined according to the recorded coordinate location, and the beam emitted based on the first beam position can directly point to the user's head location.

Figure 4:
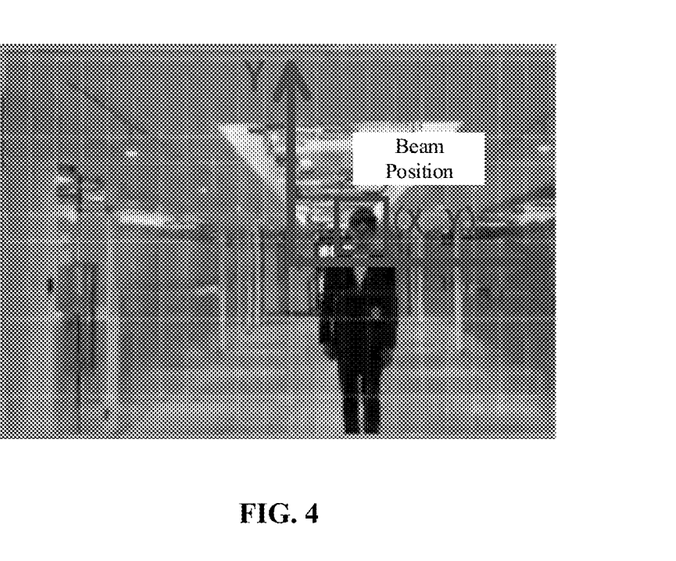
FIG. 4 is a schematic diagram of a correspondence relationship between a head location and a coordinate system according to an embodiment of the present disclosure.

In some embodiments, the preset two-dimensional coordinate system can be a two-dimensional coordinate system determined according to the environment of the practical application space. In the two-dimensional coordinate system, the application space is divided into multiple regions in a plane, and each region corresponds to a specific beam position. FIG. 4 is a schematic diagram of a correspondence relationship between a head location and a coordinate system according to an embodiment of the present disclosure. The point in the box in FIG. 4 may be the center point of the head location, and the corresponding coordinates are (X, Y), and the beam position corresponding to the coordinate region where the center point is located is beam position n (i.e., the first beam position).

In some embodiments, the preset coordinate system may also be a three-dimensional coordinate system. When the preset coordinate system is a three-dimensional coordinate system, the camera on the side of the first device may be a depth camera. The introduction of the above-mentioned two-dimensional coordinate system is only a schematic introduction. The coordinate system can ensure that the location user's head is in the preset coordinate system can be determined. The present disclosure does not limit the coordinate system.

Figure 5:
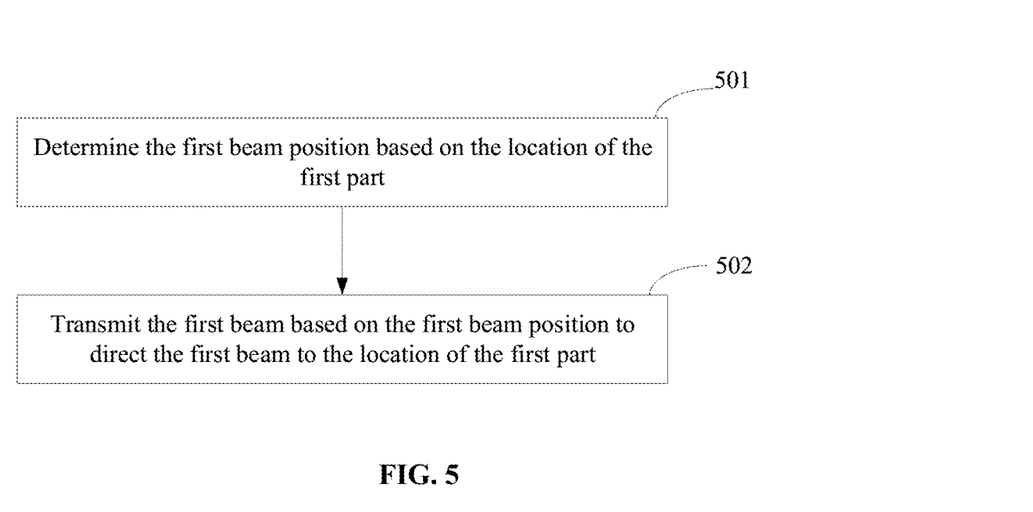
FIG. 5 is a flowchart of transmitting a first beam according to an embodiment of the present disclosure.

FIG. 5 is a flowchart of transmitting a first beam according to an embodiment of the present disclosure. As shown in FIG. 5, based on the above content, transmitting and controlling the first beam to point to the location of the first part may include the following steps.

501. The first device determines the first beam position based on the location of the first part.

In some embodiments, determining the first beam position based on the location of the first part may include: determining the first beam position corresponding to the location of the first part based on a pre-configured mapping relationship between the beam position and the location. The mapping relationship between a beam position and a location may be the mapping relationship between beam position and coordinate region.

502. The first device transmits a first beam based on the first beam position to direct the first beam to the location of the first part.

The coordinate area corresponding to the first beam position includes the center of the user's head. After the first beam position is determined, the first beam is thus directly transmitted based on the first beam position to ensure that the first beam can point to the location of the user's head.

Figure 6:
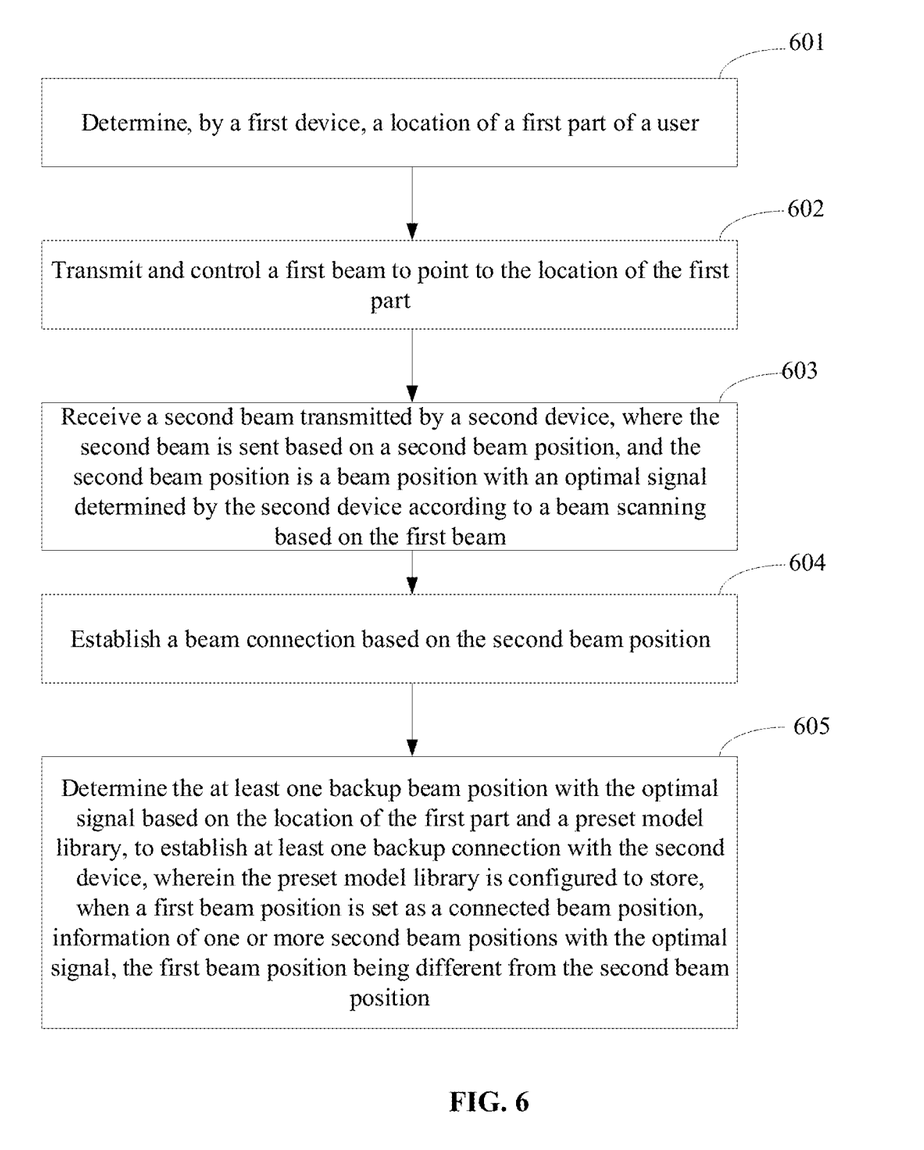
FIG. 6 is a schematic diagram of a process of establishing a beam connection according to an embodiment of the present disclosure.

FIG. 6 is a schematic diagram of a process of establishing a beam connection according to an embodiment of the present disclosure. As shown in FIG. 6, the method for establishing a beam connection may include the following steps.

601. The first device determines the location of the first part of the user.

602. The first device transmits and controls the first beam to point to the location of the first part.

603. The first device receives the second beam transmitted by the second device, where the second beam is sent out based on the second beam position, and the second beam position is the beam position having the optimal signal (e.g., having the highest level signal, or having the highest electrical signal) determined by the second device based on the beam scanning of the first beam.

604. The first device establishes a beam connection based on the second beam position.

605. The first device determines at least one backup beam position with the optimal signal based on the location of the first part and the preset model library, so as to establish at least one backup connection with the second device. When each beam position is used as a connected beam position, the preset model library stores information of several beam position having the optimal signal, besides the connected beam position.

The first device side may preset the coordinate system, and different regions of the coordinate system correspond to different beam positions. The region where the first location is located in the preset coordinate system may be determined. Several backup beam positions may be needed in case the first beam between the location of the first part and the first device is blocked. Such that, when the first beam between the location of the first part and the first device is blocked, backup beams transmitted with the backup beam position may establish beam connection with the beam transmitted by the VR device to realize data transmission.

The first device can perform model training based on its application environment in advance. For example, for each of the beam positions, when it is set as the connected beam position, one or several other beam positions with the optimal signal can form the beam position model library. Theoretically, the region in coordinate system corresponding to the backup beam position is adjacent or not far away from the region corresponding to the first beam position, so as to ensure a better signal. In this way, after the location of the first part is determined, its corresponding first beam position can also be determined. According to the corresponding relationship between the first beam position (the connected beam position) and its backup beam position in the preset model library, the best signal can be determined. Preferably at least one backup beam position, the method of establishing a beam connection between the backup beam position and the second device is the same as the process of establishing a beam connection between the first beam position and the second beam position. FIG. 6 is a schematic diagram of a process of establishing a beam connection according to an embodiment of the present disclosure, and the foregoing embodiments can be understood with reference to FIG. 6.

The backup beam position solution can ensure that when the beam cannot be transmitted normally because there is an obstruction between the first device and the user's first location, the beam connection established by other backup beam positions can transmit data without affecting the normal use of the user.

In practical applications, it is possible that a first device needs to establish beam connections with multiple second devices. In this case, the method for establishing beam connections described in the foregoing embodiments may further include: when there are more than one second devices, identifying each of the second devices; and establishing beam connections with each of the second devices through different communication links; establishing beam connection with each of the second device through time division multiplexing, frequency division multiplexing, or code division multiplexing, respectively.

In some embodiments, identifying each of the second devices may include: sending out an identification signal for acquiring the attribute and status information of each of the second devices; receiving response information returned by the second device according to the identification signal; combining the response information and the locations of at least two first parts to determine the location information of the second device. The at least two first parts may include the location of the head and the locations of the two hands. The first device may determine the quantity of the second device based on the application selected by the user. For example, when the user selects a virtual reality movie, the second device includes only a head-mounted device, and the first location only includes the user's head location. When the user selects a virtual reality game, the second device includes a head-mounted device and two handheld devices, and the first location include the location of the user's head and the locations of two hand locations.

The attribute and state information of the second device may include, but is not limited to, for example, a helmet, a start state; or a left handle, a start state, respectively. Combining the attribute and status information of the second device and the location of the user's first part obtained by analysis in the collected images, different second devices can be identified.

In some embodiments, after each of the second devices are determined, different millimeter wave antenna modules on the first device side each can match each of the second devices according to the configuration information, so as to establish beam connection to each of the second devices. In some other embodiments, the first device may only have one millimeter wave antenna module configured to establish beam connection with each of the second device through time division multiplexing, frequency division multiplexing, or code division multiplexing, respectively, and conduct data communication with each of the second devices according to configuration requirement.

The method for establishing a beam connection can be applied to a scenario that includes multiple second devices, thereby enriching the types of applications that users can experience.

For the sake of simple description, the foregoing method embodiments are described as a series of action combinations, but those skilled in the art should know that this application is not limited by the described sequence of actions. Some steps of the present disclosure can be performed in other order or simultaneously. Those skilled in the art should also know that the embodiments described in the specification are some exemplary embodiments. Some actions and modules involved may not necessarily required by this application.

The above embodiments of the present disclosure provides a method, and the method may be implemented in various forms and manners. Another aspect of the present disclosure also provides a device. Some embodiments of the device are described below.

Figure 7:
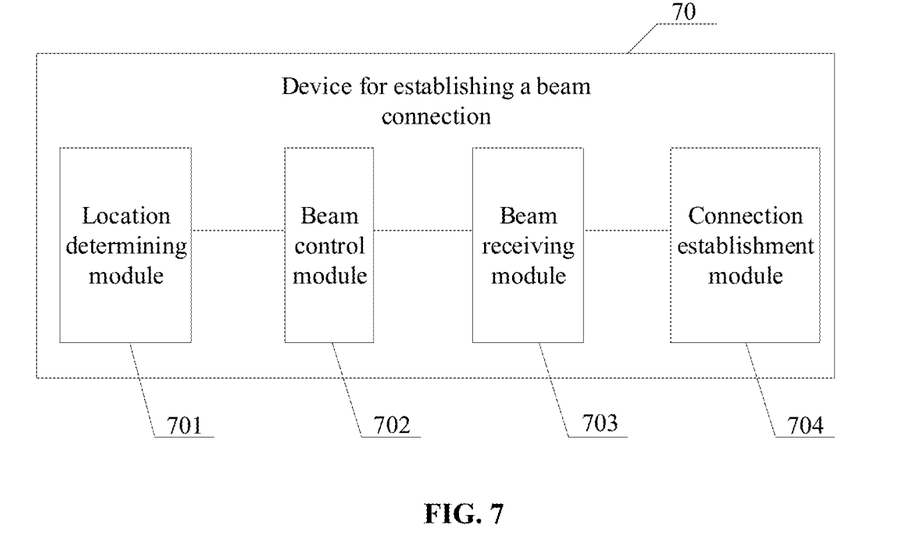
FIG. 7 is a schematic structural diagram of a device for establishing a beam connection disclosed in an embodiment of the present disclosure.

FIG. 7 is a schematic structural diagram of a device for establishing a beam connection disclosed in an embodiment of the present disclosure. As shown in FIG. 7, the device 70 for establishing a beam connection may include the following parts.

A location determining module 701 may be configured to determine the location of the user's first part.

In some embodiments, the execution subject of the device for establishing a beam connection is located on the side of the first device, and may be the processor of the first device. The first device and the user are not in the same location. The first device can be, but is not limited to, a device at a PC side in PC VR device. The PC side and the VR side need to communicate data to bring better virtual reality experience to the user. The location of the first part may be determined according to the wearing location of the VR terminal. For example, the VR device is usually worn on the user's head, and the location of the first part may be the location of the user's head.

The first device determines the location of the first part of the user. For example, the first device may collect an image of the user in front of the first device, and then analyze and process the collected image through an artificial intelligence algorithm to identify the location of the first part of the user.

A beam control module 702 is configured to transmit and control the first beam to point to the location of the first part.

After the location of the user's first part is determined by the analysis process, the first device can control the millimeter wave front to emit the first beam so that the first beam can directly point to the location of the first part. In some embodiment, the location of the first part is the part where the user wears the VR device, and it can thus be ensured that the first beam emitted by the first device side is optimal with respect to the signal of the VR device without obstruction.

A beam receiving module 703 is configured to receive a second beam transmitted by a second device. The second beam is sent out based on a second beam position, and the second beam position is the beam position with the optimal signal determined by the second device based on the beam scanning of the first beam.

In some embodiments, the second device may be a VR device in the PC VR device. After receiving the first beam sent by the first device, the second device can traverse all beam positions of the first beam to determine the second beam position having the optimal signal based on the first beam. The second device can then emit the second beam based on the second beam position.

A connection establishment module 704 is configured to establish a beam connection based on the second beam position.

After the second device sends out the second beam, the second beam may directly establish a beam connection with the first beam. The established beam connection between the first beam and the second beam is a beam communication channel with an optimal signal between the first device and the second device.

In this embodiment, according to the device for establishing a beam connection, after determining the location of the first part of the user mounted with the second device, the first beam is directly pointed to the second device at the location of the first part, which can ensure that the signal is optimal. Compared with the conventional technologies where the first device needs to traverse the beam position to find the beam position having the optimal signal, the method in accordance with the embodiments of the present disclosure can greatly improve the beam matching speed and improve the user experience.

In some embodiments, the location determining module 701 may be configured to: collect a first image through a camera; identify and determine the head location of the person in the first image according to a head recognition algorithm; and determine coordinate locations of the head in a preset coordinate system.

In some embodiments, an optical camera may be added to the millimeter wave antenna module to transmit the beam on the first device side. Such that, the first device may employ the camera to collect a first image that includes the user, perform identification analysis in the first image according to a head recognition algorithm to determine the location of the head. A two-dimensional coordinate system can be preset in the first device system according to the application environment. After the user's head location is recognized, the head location is recorded in the preset two-dimensional coordinate system. The corresponding first beam position can be determined according to the recorded coordinate location, and the beam emitted based on the first beam position can directly point to the user's head location.

In some embodiments, the preset two-dimensional coordinate system can be a two-dimensional coordinate system determined according to the environment of the practical application space. In the two-dimensional coordinate system, the application space is divided into multiple regions in a plane, and each region corresponds to a specific beam position.

In some embodiments, the preset coordinate system may also be a three-dimensional coordinate system. When the preset coordinate system is a three-dimensional coordinate system, the camera on the side of the first device may be a depth camera. The introduction of the above-mentioned two-dimensional coordinate system is only a schematic introduction. The coordinate system can ensure that the location user's head is in the preset coordinate system can be determined. The present disclosure does not limit the coordinate system.

Figure 8:
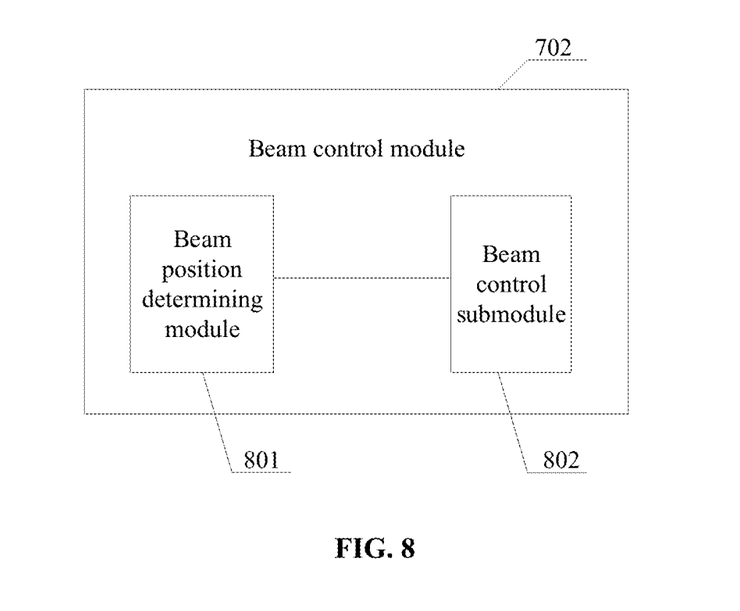
FIG. 8 is a schematic structural diagram of a beam control module according to an embodiment of the present disclosure.

FIG. 8 is a schematic structural diagram of a beam control module according to an embodiment of the present disclosure. As shown in FIG. 8, the beam control module 702 may include the following parts.

A beam position determining module 801 may be configured to determine the first beam position based on the location of the first part.

In some embodiments, determining the first beam position based on the location of the first part may include: determining the first beam position corresponding to the location of the first part based on a pre-configured mapping relationship between the beam position and the location. The mapping relationship between a beam position and a location may be the mapping relationship between beam position and coordinate region.

A beam control submodule 802 is configured to transmit a first beam based on the first beam position to direct the first beam to the location of the first part.

The coordinate area corresponding to the first beam position includes the center of the user's head. After the first beam position is determined, the first beam is thus directly transmitted based on the first beam position to ensure that the first beam can point to the location of the user's head.

Figure 9:
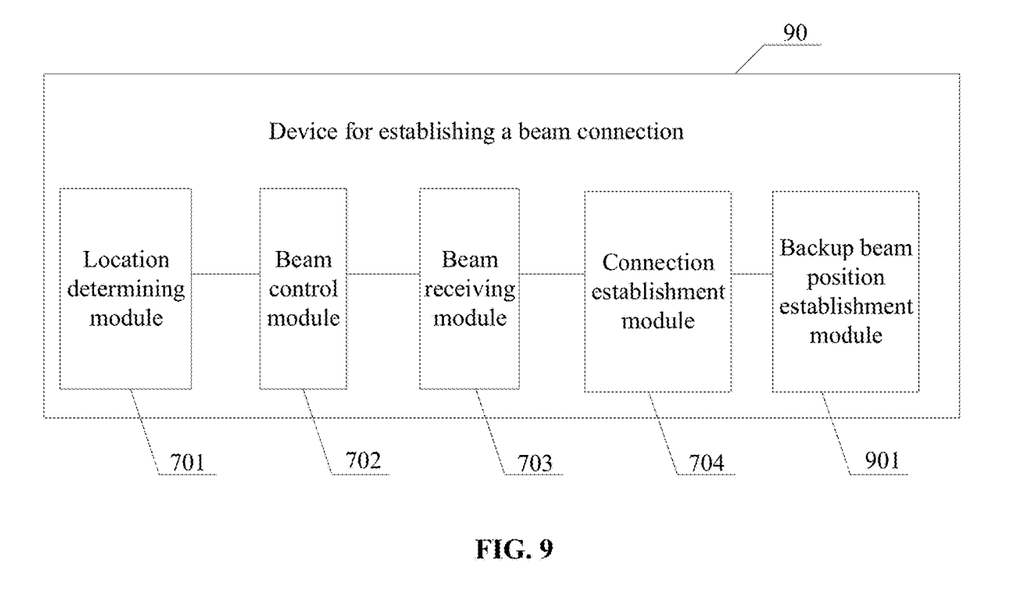
FIG. 9 is a schematic structural diagram of a device for establishing a beam connection according to another embodiment of the present disclosure.

FIG. 9 is a schematic structural diagram of a device for establishing a beam connection according to another embodiment of the present disclosure. As shown in FIG. 9, the device 90 for establishing a beam connection may include the following parts.

A location determining module 701 may be configured to determine the location of the user's first part.

A beam control module 702 is configured to transmit and control the first beam to point to the location of the first part.

A beam receiving module 703 is configured to receive the second beam transmitted by the second device. the second beam is sent out based on the second beam position, and the second beam position is the beam position having the optimal signal (e.g., having the highest level signal, or having the highest electrical signal) determined by the second device based on the beam scanning of the first beam.

The connection establishment module 704 is configured to establish a beam connection based on the second beam position.

A backup beam position establishment module 901 is configured to determine at least one backup beam position with the optimal signal based on the location of the first part and the preset model library, so as to establish at least one backup connection with the second device. When each beam position is used as a connected beam position, the preset model library stores information of several beam position having the optimal signal, besides the connected beam position.

The first device side may preset the coordinate system, and different regions of the coordinate system correspond to different beam positions. The region where the first location is located in the preset coordinate system may be determined. Several backup beam positions may be needed in case the first beam between the location of the first part and the first device is blocked. Such that, when the first beam between the location of the first part and the first device is blocked, backup beams transmitted with the backup beam position may establish beam connection with the beam transmitted by the VR device to realize data transmission.

The first device can perform model training based on its application environment in advance. For example, for each of the beam positions, when it is set as the connected beam position, one or several other beam positions with the optimal signal can form the beam position model library. Theoretically, the region in coordinate system corresponding to the backup beam position is adjacent or not far away from the region corresponding to the first beam position, so as to ensure a better signal. In this way, after the location of the first part is determined, its corresponding first beam position can also be determined. According to the corresponding relationship between the first beam position (the connected beam position) and its backup beam position in the preset model library, the best signal can be determined. Preferably at least one backup beam position, the method of establishing a beam connection between the backup beam position and the second device is the same as the process of establishing a beam connection between the first beam position and the second beam position.

The backup beam position solution can ensure that when the beam cannot be transmitted normally because there is an obstruction between the first device and the user's first location, the beam connection established by other backup beam positions can transmit data without affecting the normal use of the user.

In practical applications, it is possible that a first device needs to establish beam connections with multiple second devices. In this case, the method for establishing beam connections described in the foregoing embodiments may further include: when there are more than one second devices, identifying each of the second devices; and establishing beam connections with each of the second devices through different communication links; establishing beam connection with each of the second device through time division multiplexing, frequency division multiplexing, or code division multiplexing, respectively.

In some embodiments, identifying each of the second devices may include: sending out an identification signal for acquiring the attribute and status information of each of the second devices; receiving response information returned by the second device according to the identification signal; combining the response information and the locations of at least two first parts to determine the location information of the second device.

The attribute and state information of the second device may include, but is not limited to, for example, a helmet, a start state; or a left handle, a start state, respectively. Combining the attribute and status information of the second device and the location of the user's first part obtained by analysis in the collected images, different second devices can be identified.

In some embodiments, after each of the second devices are determined, different millimeter wave antenna modules on the first device side each can match each of the second devices according to the configuration information, so as to establish beam connection to each of the second devices. In some other embodiments, the first device may only have one millimeter wave antenna module configured to establish beam connection with each of the second device through time division multiplexing, frequency division multiplexing, or code division multiplexing, respectively, and conduct data communication with each of the second devices according to configuration requirement.

The device for establishing a beam connection can be applied to a scenario that includes multiple second devices, thereby enriching the types of applications that users can experience.

In some embodiments, the device for establishing a beam connection in the foregoing embodiments may include a processor and a memory. The location determining module, beam control module, beam receiving module, and connection establishment module in the foregoing embodiments may be stored as program modules in the memory. The processor may execute the above-mentioned program modules stored in the memory to realize the corresponding functions.

The processor contains a kernel, which can call the corresponding program module from the memory. The processor may contain one or more kernels, and the processing of the return visit data can be realized by adjusting the kernel parameters.

The memory may include non-permanent memory in a computer readable medium, random access memory (RAM) and/or non-volatile memory, such as read-only memory (ROM) or flash memory (flash RAM). The memory includes at least one memory chip.

Some embodiments of the present disclosure provide a storage medium. The storage medium stores programs, and when the program is executed by a processor, the method for establishing a beam connection described in the foregoing embodiments can be implemented.

Some embodiments of the present disclosure provide a processor configured to run a program, where the method for establishing a beam connection described in the foregoing embodiment can be implemented when the program is running.

Further, some embodiments of the present disclosure also provide an electronic apparatus, including: a processor and a memory configured to store executable instructions of the processor. The executable instructions include: first device determines a location of a first part of a user; transmits and controls a first beam to point to the location of the first part; receives a second beam transmitted by a second device; and establishes a beam connection based on the second beam position. the second beam position is the beam position with the optimal signal determined by the second device based on the beam scanning of the first beam.

Embodiments of the present specification are described in a progressive manner, and each embodiment focuses on differences from other embodiments, and the same or similar parts between the various embodiments may be referred to each other. The device disclosed in the present disclosure corresponds to the method disclosed in the present disclosure, thus, the description of the device is relatively simple, and the relevant part can be referred to the description of the method.

In addition, it should be noted that, in the above embodiments, relational terms such as first, second, etc. are only used to distinguish one operation, unit or module from another operation, unit or module. It is not required or implied that any such actual relationship or order exists between the elements, operations, or modules. Furthermore, the terms "comprising," "including," or any other variations thereof is intended to encompass a non-exclusive inclusion. As such, a process, method, or system including a series of elements includes not only these elements, but also other elements not explicitly listed, or elements that are inherent to such process, method, or such system. An element that is defined by the phrase "comprising an element" does not exclude the presence of additional equivalent elements in the process, method or system including the element.

The steps of the method or algorithm described in the embodiments disclosed in this document can be directly implemented by hardware, a software module executed by a processor, or a combination of the two. The software module can be placed in random access memory (RAM), internal memory, read-only memory (ROM), electrically programmable ROM, electrically erasable programmable ROM, registers, hard disks, removable disks, CD-ROMs, or any other storage medium known in the technical field.

The above description of the disclosed embodiments enables those skilled in the art to implement or use the disclosure. Various modifications to these disclosed embodiments are obvious to those skilled in the art, and the general principles defined herein may be implemented in other embodiments without departing from the spirit or scope of the disclosure. Therefore, the present disclosure is not limited to the embodiments disclosed herein, but the scope of the disclosure is to be accorded as the widest range consistent with the principles and novel features disclosed herein.

What is claimed is:

1. A method for establishing a beam connection, including:
   determining, by a first device, a location of a first part of a user;
   transmitting and pointing a first beam to the location of the first part;
   receiving a second beam transmitted by a second device, wherein the second beam is sent based on a second beam position, and the second beam position is a beam position with an optimal signal determined by the second device according to a beam scanning based on the first beam;
   determining at least one backup beam position to establish at least one backup connection with the second device; and
   establishing a beam connection based on the second beam position.

2. The method according to claim 1, wherein transmitting and pointing the first beam to the location of the first part includes:
   determining a first beam position based on the location of the first part; and
   transmitting the first beam based on the first beam position, directing the first beam to the location of the first part.

3. The method according to claim 2, wherein determining the first beam position based on the location of the first part includes:
   determining the first beam position corresponding to the location of the first part based on a mapping relationship between a beam position and a location.

4. The method according to claim 1, wherein determining, by the first device, the at least one backup beam position to establish the at least one backup connection with the second device includes:
   determining the at least one backup beam position with the optimal signal based on the location of the first part and a preset model library, to establish at least one backup connection with the second device, wherein the preset model library is configured to store, when a first beam position is set as a connected beam position, information of one or more second beam positions with the optimal signal, the first beam position being different from the second beam position.

5. The method according to claim 1, the method further comprising:
   receiving a plurality of second beams transmitted by a plurality of second devices;
   identifying each of the plurality of second devices; and
   establishing a beam connection with each of the plurality of second devices, including:
      using different communication links to establish the beam connection with each of the plurality of second devices, respectively; or
      using time division multiplexing, frequency division multiplexing, and code division multiplexing to establish the beam connection with each of the plurality of second devices, respectively.

6. The method according to claim 5, wherein:
   each of the plurality of second devices has a first part; and
   identifying each of the plurality of second devices includes:
      sending out an identification signal for obtaining the attribute and status information of the plurality of second devices;
      receiving response information returned by the plurality of second devices according to the identification signal; and
      determining location information of the plurality of second devices according to the response information and locations of at least two first parts of the plurality of second devices.

7. The method according to claim 1, wherein determining the position of the first part of the user comprises:
   collecting a first image through a camera;
   identifying and determining a location of a head of the user in the first image according to a head recognition algorithm; and determining a coordinate of the location of the head of the user in a preset coordinate system.

8. An electronic apparatus, including:
a processor; and
a memory for storing executable instructions of the processor, when executed by the processor, the instructions causing the processor to:
determine a location of a first part of a user;
transmit and point a first beam to the location of the first part;
receive a second beam transmitted by a device, wherein the second beam is sent based on a second beam position, and the second beam position is a beam position with an optimal signal determined by the device according to a beam scanning based on the first beam;
determine at least one backup beam position to establish at least one backup connection with the second device; and
establish a beam connection based on the second beam position.

9. The electronic apparatus according to claim 8, wherein when executed by the processor, the instructions further cause the processor to:
determine a first beam position based on the location of the first part; and
transmit the first beam based on the first beam position, directing the first beam to the location of the first part.

10. The electronic apparatus according to claim 9, wherein when executed by the processor, the instructions further cause the processor to:
determine the first beam position corresponding to the location of the first part based on a mapping relationship between a beam position and a location.

11. The electronic apparatus according to claim 8, wherein when executed by the processor, the instructions further cause the processor to:
determine the at least one backup beam position with the optimal signal based on the location of the first part and a preset model library, to establish at least one backup connection with the device, wherein the preset model library is configured to store, when a first beam position is set as a connected beam position, information of one or more second beam positions with the optimal signal, the first beam position being different from the second beam position.

12. The electronic apparatus according to claim 8, wherein when executed by the processor, the instructions further cause the processor to:
receive a plurality of second beams transmitted by a plurality of devices;
identify each of the plurality of devices; and
establish a beam connection with each of the plurality of devices, including:
using different communication links to the establish beam connection with each of the plurality of devices, respectively; or
using time division multiplexing, frequency division multiplexing, and code division multiplexing to establish the beam connection with each of the plurality of devices, respectively.

13. The electronic apparatus according to claim 12, wherein:
each of the plurality of devices has a first part; and
when executed by the processor, the instructions further cause the processor to:

send out an identification signal for obtaining the attribute and status information of the plurality of devices;
receive response information returned by the plurality of devices according to the identification signal; and
determine location information of the plurality of devices according to the response information and locations of at least two first parts of the plurality of devices.

14. The electronic apparatus according to claim 8, wherein when executed by the processor, the instructions further cause the processor to:
collect a first image through a camera;
identify and determine a location of a head of the user in the first image according to a head recognition algorithm; and
determine a coordinate of the location of the head of the user in a preset coordinate system.

15. A non-transitory computer readable storage medium storing a computer program, wherein the computer program is executed by a processor to implement a method for establishing a beam connection, the method comprising:
determining, by a first device, a location of a first part of a user;
transmitting and pointing a first beam to the location of the first part;
receiving a second beam transmitted by a second device, wherein the second beam is sent based on a second beam position, and the second beam position is a beam position with an optimal signal determined by the second device according to a beam scanning based on the first beam;
determining at least one backup beam position to establish at least one backup connection with the second device; and
establishing a beam connection based on the second beam position.

16. The non-transitory computer readable storage medium according to claim 15, wherein the method further including:
determining a first beam position based on the location of the first part; and
transmitting the first beam based on the first beam position, directing the first beam to the location of the first part.

17. The non-transitory computer readable storage medium according to claim 15, wherein the method further including:
receiving a plurality of second beams transmitted by a plurality of second devices;
identifying each of the plurality of second devices; and
establishing a beam connection with each of the plurality of second devices, including:
using different communication links to establish the beam connection with each of the plurality of second devices, respectively; or
using time division multiplexing, frequency division multiplexing, and code division multiplexing to establish the beam connection with each of the plurality of second devices, respectively.

18. The non-transitory computer readable storage medium according to claim 15, wherein the method further including:
collecting a first image through a camera;
identifying and determining a location of a head of the user in the first image according to a head recognition algorithm; and determining a coordinate of the location of the head of the user in a preset coordinate system.

\* \* \* \* \*